United States Patent

Lange et al.

Patent Number: 5,547,477
Date of Patent: Aug. 20, 1996

[54] DYE MIXTURES WITH PYRIDONEAZO DYES

[75] Inventors: Arno Lange, Bad Duerkheim; Helmut Degen, Frankenthal; Gunther Lamm, Hassloch; Helmut Reichelt, Neustadt; Dieter Wegerle, Mannheim, all of Germany

[73] Assignee: BASF Aktiengesellschaft, Ludwigshafen, Germany

[21] Appl. No.: 360,770

[22] PCT Filed: Jun. 16, 1993

[86] PCT No.: PCT/EP93/01516

§ 371 Date: Dec. 23, 1994

§ 102(e) Date: Dec. 23, 1994

[87] PCT Pub. No.: WO94/00518

PCT Pub. Date: Jan. 6, 1994

[30] Foreign Application Priority Data

Jun. 26, 1992 [DE] Germany .................. 42 21 008.9

[51] Int. Cl.[6] .................................................. C09B 67/22
[52] U.S. Cl. ........................................ 8/639; 8/693
[58] Field of Search .......................... 534/772; 8/693, 8/639

[56] References Cited

U.S. PATENT DOCUMENTS 3,954,396  5/1976  Ribka ............................................ 8/693
5,066,791  11/1991  Hansen et al. .......................... 534/772

FOREIGN PATENT DOCUMENTS 314002  3/1989  European Pat. Off. .

Primary Examiner—Margaret Einsmann
Attorney, Agent, or Firm—Oblon, Spivak, McClelland, Maier & Neustadt, P.C.

[57] ABSTRACT

Dye mixtures useful for dyeing or printing textile fibers or fabrics contain from 40 to 75% by weight, based on the weight of the dyes, of a dye of the formula

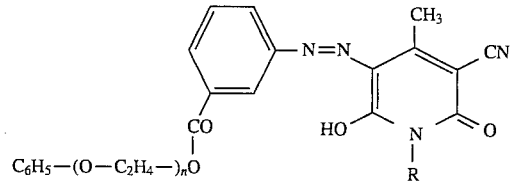

where R is $C_1$–$C_4$-alkyl and n is 1 and from 25 to 60% by weight, based on the weight of the dyes, of a dye of the abovementioned formula where R is $C_1$–$C_4$-alkyl and n is 2.

5 Claims, No Drawings

DYE MIXTURES WITH PYRIDONEAZO DYES

The present invention relates to novel dye mixtures containing from 40 to 75% by weight, based on the weight of the dyes, of a dye of the formula I

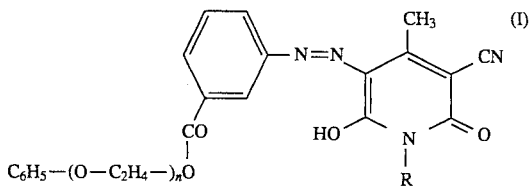

where R is $C_1$–$C_4$-alkyl and n is 1, and from 25 to 60% by weight, based on the weight of the dyes, of a dye of the formula I where R is $C_1$–$C_4$-alkyl and n is 2, to dye preparations containing the novel dye mixtures, and to the use of the dye mixtures for dyeing or printing textile fibers or fabrics.

EP-A-314 002 discloses not only the individual components of the abovementioned dye mixture but also dye mixtures. However, the products mentioned therein are not fully satisfactory from an application viewpoint.

It is an object of the present invention to provide dyes which have an advantageous application property profile and are readily obtainable.

We have found that this object is achieved by the dye mixtures defined at the beginning.

R in the formula I is for example methyl, ethyl, propyl, isopropyl, butyl, isobutyl or sec-butyl.

Preference is given to dye mixtures containing dyes of the formula I where R is methyl or ethyl, in particular methyl.

As well as the dyes of the formula I where n is 1 or 2, the novel dye mixtures may additionally contain minor amounts (up to 10% by weight, preferably up to 4% by weight, each percentage being based on the weight of the dyes where n is 1 and 2) of dyes of the formula I where n is 3, 4 or 5.

The novel dye mixtures can be obtained in a conventional manner. In one possible option, an amine mixture containing from 35 to 90% by weight, based on the weight of the amines, of an amine of the formula II

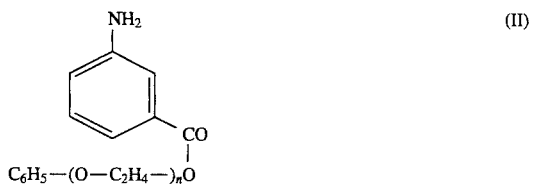

where n is 1, from 10 to 65% by weight, based on the weight of the amines, of an amine of the formula II where n is 2, and optionally up to 10% by weight, based on the weight of the amines where n is 1 and 2, of one or more amines of the formula I where n is 3, 4 or 5 is diazotized and coupled with a pyridone of the formula III

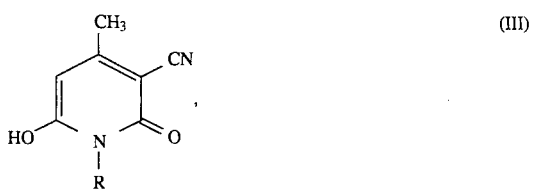

where R is as defined above. After the coupling has ended, the reaction mixture is in general subsequently heat treated at from 60° to 90° C.

If desired, the novel mixtures may contain further components, for example dispersants, such as ligninsulfonates or sulfonation products of the reaction product of formaldehyde with aromatics, or other auxiliaries.

Accordingly, the present invention also provides dye preparations containing from 15 to 60% by weight, based on the weight of the dye preparation, of a dye mixture as defined at the beginning and from 40 to 85% by weight, based on the weight of the dye preparation, of a dispersant.

The novel dye mixtures are advantageously useful for dyeing or printing textile fibers or fabrics, in particular polyesters, but also fibers or fabrics composed of cellulose esters or polyamides or blends of polyesters with cellulose fibers.

Their dyeing properties are distinctly superior to those of the individual dyes. In particular, they are more compatible with blue and red dyes.

Embodiments of the invention will now be more particularly described by way of example.

EXAMPLE 1

301 g of the amine of the formula

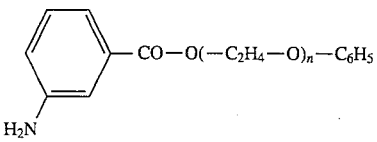

where n is 2 and 660.5 g of the amine of the above formula where n is 1 were dissolved in 380 ml of glacial acetic acid. 1100 ml of concentrated hydrochloric acid and 295 g of concentrated sulfuric acid were added. The mixture was then cooled down with 4.5 kg of ice. At from 0° to 5° C. the mixture was admixed with 1140 ml of 23% strength by weight aqueous sodium nitrite solution and subsequently stirred at from 0° to 5° C. for 90 minutes. Excess nitrous acid was then destroyed with amidosulfuric acid and the reaction mixture was added in the course of 45 minutes to a solution of 586 g of 1,4-dimethyl-2-hydroxy-5-cyanopyrid-6-one in 7 liters of water and 290 g of sodium hydroxide solution (50% strength by weight) which was being cooled to 0° C. with ice. During the addition the pH of the resulting reaction mixture was maintained within the range from 4 to 8 with ice-cold 20% strength by weight sodium hydroxide solution. The temperature of the reaction mixture was maintained at ≦15° C. with ice. After the addition had ended, the pH of the dye suspension was adjusted to 7.4–7.8. The suspension was subsequently stirred at that pH for 1–3 hours and then heated to 80° C. and thereafter the mixture was left at that temperature for 30–60 minutes as a heat treatment. The coarsely crystalline dye was filtered off with suction and washed neutral and salt-free with water. This yielded 1540 g of a dye mixture which melts at 128° C. and is composed of 1 mol of the dye of the formula

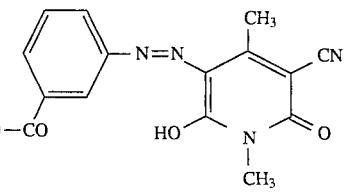

where n is 2, and 2.57 mol of the dye of the above formula where n is 1.

This dye mixture, especially when mixed with blue and red dyes, produces level dyeings on polyester fabric at a dyeing temperature of from 120° to 130° C. in that the individual dyes exhaust at the same rate.

EXAMPLE 2

A mixture of 126.5 g of the amine of the formula

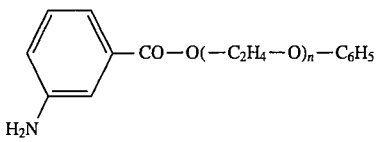

where n is 2 and 294 g of the amine of the above formula where n is 1 was melted and stirred at about 80° C. into 980 ml of cold hydrochloric acid of about 25% strength by weight. 1 g of a wetting agent for use under acidic conditions was added, and the mixture was subsequently stirred for 1 hour, at which point the amine hydrochloride had precipitated. The mixture was then cooled down to 0° C. with ice and was then admixed at not more than 6° C. with 501 ml of 23% strength by weight aqueous sodium nitrite solution in the course of 10 minutes. The resulting diazonium salt solution was subsequently stirred at from 0° to 5° C. for 1.5 hours. Excess nitrous acid was then destroyed and the diazonium salt solution was added to a solution at 0° C. of 256.5 g of 1,4-dimethyl-2-hydroxy-5-cyanopyrid-6-one in 5 liters of water. In the course of the addition the reaction mixture was also admixed with dilute sodium hydroxide solution so that the pH of the reaction mixture was within the range from 4.0 to 7.5. The coupling was complete a few minutes after addition of the diazonium salt. The suspension was heated at pH 7–7.8 to 80°–85° C. and heat treated for 45 minutes, and the precipitated dye was isolated by filtering off with suction. Washing with water and drying left 692 g of a yellow powder which melts at 128° C.

The dye powder contains 30% by weight of the dye of the formula

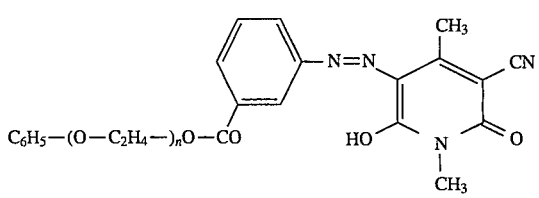

where n is 2 and 70% by weight of the dye of the above formula where n is 1.

We claim:

1. Dye mixtures containing from 40 to 75% by weight, based on the weight of the dyes, of a dye of the formula I

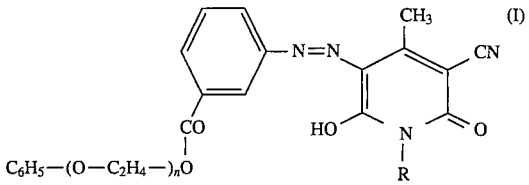

where R is $C_1$–$C_4$-alkyl and n is 1, and from 25 to 60% by weight, based on the weight of the dyes, of a dye of the formula I where R is $C_1$–$C_4$-alkyl and n is 2.

2. Dye mixtures as claimed in claim 1 wherein R is methyl or ethyl.

3. Dye preparations containing from 15 to 60% by weight, based on the weight of the dye preparation, of a dye mixture as claimed in claim 1 and from 40 to 85% by weight, based on the weight of the dye preparation, of a dispersant.

4. A method for dyeing or printing textile fibers or fabrics, comprising dyeing or printing textile fibers or fabrics with dye mixtures as defined by claim 1.

5. Dye mixtures as claimed in claim 1, wherein R is methyl.

* * * * *